US012558817B2

(12) United States Patent     (10) Patent No.:   US 12,558,817 B2

Tashiro et al.          (45) Date of Patent:     Feb. 24, 2026

---

(54) METHOD OF REMOVING IMPURITIES FROM PLASTIC

(71) Applicant: TOYO SEIKAN GROUP HOLDINGS, LTD., Tokyo (JP)

(72) Inventors: Yuuki Tashiro, Yokohama (JP); Seishi Yoshikawa, Yokohama (JP); Jotaro Nagao, Tokyo (JP); Azusa Otsuki, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 18/035,960

(22) PCT Filed: Nov. 15, 2021

(86) PCT No.: PCT/JP2021/041911

§ 371 (c)(1),
(2) Date: May 9, 2023

(87) PCT Pub. No.: WO2022/124015

PCT Pub. Date: Jun. 16, 2022

(65) Prior Publication Data

US 2023/0415381 A1     Dec. 28, 2023

(30) Foreign Application Priority Data

Dec. 7, 2020    (JP) ................................. 2020-202669

(51) Int. Cl.
   *B29B 17/02*        (2006.01)
   *B08B 3/10*         (2006.01)

(52) U.S. Cl.
   CPC .............. *B29B 17/02* (2013.01); *B08B 3/106* (2013.01); *B08B 2230/01* (2013.01); *B29B 2017/0289* (2013.01); *B29B 2017/0293* (2013.01)

(58) Field of Classification Search
   CPC ..... B29B 17/02; B29B 3/106; B29B 2230/01; B29B 2017/0289; B29B 2017/0293
   See application file for complete search history.

(56) References Cited

U.S. PATENT DOCUMENTS

| | | | |
|---|---|---|---|
| 5,331,087 A | 7/1994 | Menges | |
| 6,352,644 B1 * | 3/2002 | Hawthorne ............... | C02F 1/26 |
| | | | 210/737 |
| 11,542,438 B1 * | 1/2023 | Choi ......................... | C10G 1/10 |
| 2003/0018161 A1 | 1/2003 | Suzuki et al. | |
| 2008/0103347 A1 | 5/2008 | Jody et al. | |
| 2012/0187227 A1 * | 7/2012 | Ando ......................... | B03B 5/38 |
| | | | 241/24.28 |

(Continued)

FOREIGN PATENT DOCUMENTS

| | | | | |
|---|---|---|---|---|
| EP | 1990106 A1 * | 11/2008 | ............... | B09B 3/00 |
| JP | 5-228936 A | 9/1993 | | |

(Continued)

OTHER PUBLICATIONS

Machine Translation of JP2021090915A (Year: 2021).*

(Continued)

*Primary Examiner* — Sharidan Carrillo

(74) *Attorney, Agent, or Firm* — Sughrue Mion, PLLC

(57) ABSTRACT

Impurities are removed from plastic by cleaning using, as a cleaning medium, water heated to a level where a dielectric constant is 60 or less.

3 Claims, 1 Drawing Sheet

(56)                    References Cited

U.S. PATENT DOCUMENTS

| | | | | | |
|---|---|---|---|---|---|
| 2021/0069732 | A1* | 3/2021 | Loop | ....................... | B04C 5/107 |
| 2023/0022441 | A1* | 1/2023 | Deng | ................... | B01D 53/229 |
| 2023/0415381 | A1* | 12/2023 | Tashiro | ................... | B29B 17/02 |

FOREIGN PATENT DOCUMENTS

| | | | |
|---|---|---|---|
| JP | 6-31733 | A | 2/1994 |
| JP | 6-173182 | A | 6/1994 |
| JP | 10-324769 | A | 12/1998 |
| JP | 11-35734 | A | 2/1999 |
| JP | 2001-122985 | A | 5/2001 |
| JP | 2001-192494 | A | 7/2001 |
| JP | 2001-323022 | A | 11/2001 |
| JP | 2004-358423 | A | 12/2004 |
| JP | 2012-167213 | A | 9/2012 |
| JP | 2020-511560 | A | 4/2020 |
| WO | 2013/018214 | A1 | 2/2013 |
| WO | 2018/118578 | A1 | 6/2018 |

OTHER PUBLICATIONS

Machine Translation of JPH09263772A (Year: 1997).*
Machine Translation of JP2003260425 (Year: 2003).*
Machine Translation of JP2004106159A (Year: 2004).*
Machine Translation of CN102950670A (Year: 2013).*
International Search Report for PCT/JP2021/041911 dated Jan. 25, 2022.
Extended European Search Report dated Sep. 26, 2024 in Application No. 21903119.2.
Office Action issued Feb. 26, 2025 in Taiwan Patent Application No. 110144295.

* cited by examiner

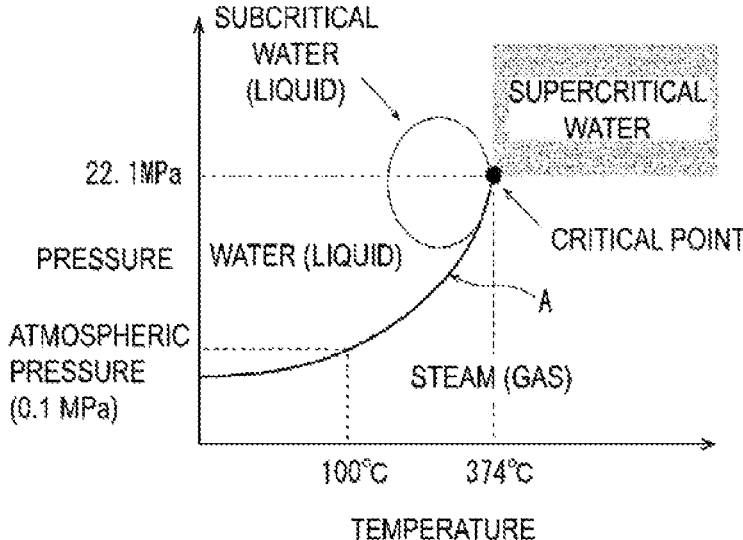

METHOD OF REMOVING IMPURITIES FROM PLASTIC

CROSS REFERENCE TO RELATED APPLICATIONS

This application is a National Stage of International Application No. PCT/JP2021/041911 filed Nov. 15, 2021, claiming priority based on Japanese Patent Application No. 2020-202669 filed Dec. 7, 2020.

TECHNICAL FIELD

The present invention relates to a method of removing impurities from a plastic.

BACKGROUND ART

In recent years, from the viewpoint of environmental protection, plastic molded products, such as films and containers, are demanded to be recycled for use. In plastic recycling, plastic molded products are not only reused as they are without changing the form, but are also crushed, collected in the form of granular materials or pellets, and used as recycled plastic for molding again.

When plastic is reused in any form, it is necessary to remove impurities from plastic contaminated by use.

The most common method of removing impurities from plastic is to wash them with organic solvents or water.

For example, PTL 1 discloses a method of removing impurities by bringing polyethylene into contact with an organic solvent and purifying the solution.

PTL 2 discloses that packaging materials (plastic films) are crushed and then chemically cleaned with acid or alkali for recycling treatment, and PTL 3 discloses that foreign matter and plastic is separated by cleaning with water.

PTL 4 discloses that recycled materials (plastic) from which impurities have been removed are reused as a material for film formation.

CITATION LIST

Patent Literature

PTL 1: JP 2020-511560T
PTL 2: JP H6-31733A
PTL 3: JP H6-173182A
PTL 4: JP 2001-122985A

SUMMARY OF INVENTION

Technical Problem

When organic solvents are used as a medium to remove impurities from plastic, there is a problem of environmental pollution and a problem that the cost for an exhaust system and waste liquid treatment of the organic solvent is high. When acid and alkali are used as cleaning medium, environmental pollution problems can be avoided, but the equipment becomes large, and the facility costs increases.

On the other hand, when water is used as the cleaning medium, it can be said that the problem of waste liquid treatment does not occur. However, in terms of detergency, water is significantly inferior to organic solvents and has insufficient detergency against oil stains, such as grease adhered on the surface of plastic. Further, water can hardly remove sorbent absorbed inside the plastic, so organic solvents are used.

Thus, an object of the present invention is to provide a method that can reduce the burden of exhaust and waste liquid treatment without causing environmental pollution problems and can remove impurities such as oil and grease adhered to or adsorbed on the plastic surface to the same degree as when organic solvents are used as a cleaning medium.

Solution to Problem

The present invention provides a method of removing impurities from plastic by washing using, as a cleaning medium, water heated to a level where a relative dielectric constant is 60 or less.

In the method of the present invention, the following means are favorably used.

(1) The cleaning medium is superheated steam.

(2) The cleaning medium is subcritical water or supercritical water that is heated to a temperature of 150° C. or higher at a pressure of 0.5 MPa or higher.

(3) The cleaning medium is supercritical water.

(4) The plastic is polyolefin.

(5) The plastic is a used plastic molded product.

(6) The impurities are dissolved in the plastic.

Advantageous Effects of Invention

In the present invention, water is used as the cleaning medium, and water can cleanly remove impurities such as oil adsorbed inside plastic (adsorptive component), in addition to oil stains such as grease adhered on the surface of plastic, as in the case where an organic solvent is used as the cleaning medium. That is, since water is used, there is no adverse effect on the environment, and large sized exhaust facilities and waste liquid treatment facilities are not needed, which is major advantage of the present invention, and is extremely useful for industrial purposes.

BRIEF DESCRIPTION OF DRAWINGS

The FIGURE is a diagram illustrating a state of water used as a cleaning medium.

DESCRIPTION OF EMBODIMENTS

Cleaning Medium

In the present invention, water is used as a cleaning medium for removing impurities from plastic, and it is important to use the water with a low dielectric constant. Specifically, in the present invention, water is heated to reduce the relative dielectric constant to 60 or less, preferably 40 or less, more preferably 30 or less, and plastic is cleaned using the water with a low dielectric constant.

That is, water at normal temperature is a unique polar solvent that has a relative dielectric constant that is significantly higher than that of organic solvents and the like, and this makes it difficult to remove contaminations due to its low affinity (oil repellency) for organic components (oil components such as grease). It is known that the relative dielectric constant decreases as temperature increases. This is utilized in the present invention to lower the dielectric constant through heating, and cleaning is performed using water in a state similar to that of an organic solvent. For example, when water is heated to about 200° C., its relative dielectric constant is about 35, which is close to the relative dielectric constant of methanol at room temperature, and when water is heated to about 300° C., its relative dielectric constant is about 20, which is close to the relative dielectric constant of acetone at room temperature, and when water is heated further to near the critical point, its relative dielectric constant is comparable to that of non-polar organic solvents such as chloroform and ethyl ether.

As can be understood from the above description, the water used in the present invention is in a state close to that of an organic solvent due to non-polarization caused by the lowered dielectric constant, and the temperature of the water is high due to the lowered dielectric constant. When such high-temperature water is in contact with plastic, polymer chains constituting the plastic are loosened, and the water having a low dielectric constant is likely to enter the plastic.

In this manner, according to the present invention, impurities adhered to the plastic surface and impurities adsorbed in the plastic can be effectively removed by using, as a cleaning medium, water that has a dielectric constant lowered through high-temperature heating and is in a state close to a non-polar state like an organic solvent. For example, when water is heated to 90° C. or higher at 0.1 MPa, the relative dielectric constant can be reduced to 60 or lower, and at the same or similar pressure, water is heated to 180° C. or higher to reduce the relative dielectric constant to 40 or lower, heated to 230° C. or higher to reduce the relative dielectric constant to 30 or lower, and heated to 300° C. or higher to reduce the relative dielectric constant to 20 or lower.

Further, in the present invention, the water used as the cleaning medium is preferably in a state called superheated steam, subcritical water, or supercritical water, through the above-mentioned heating for reducing the dielectric constant.

For example, see the FIGURE illustrating a state of water. Due to intermolecular interactions and kinetic energy changes associated with changes in pressure, water can change into solid, liquid, and steam (gas) states. As illustrated in the FIGURE, the point on the gas-liquid coexistence line A is the critical point (374° C., 22.1 MPa), water at or above this temperature and pressure is supercritical water, which has both liquid and gas properties, and subcritical water is water in a temperature and pressure region slightly below the critical point (e.g., a pressure of 0.5 MPa or higher and a temperature of 150° C. or higher). Such subcritical water and supercritical water have a low relative dielectric constant and have the property of dissolving or hydrolyzing nonpolar organic compounds. That is, by using the water heated to such a state and have a lowered dielectric constant, the impurities adhered to the surface of plastic or adsorbed inside the plastic can be effectively removed.

Note that, examples of the method of measuring the relative dielectric constant include the coaxial probe method, the concentrated constant capacitance method, the transmission line method, the free space reflection method, and the cavity resonator method (Japanese Patent No. 5499379). The method of measuring the relative dielectric constant differs depending on the measurement frequency. The coaxial probe method is used over a wide measurement band from MHz to GHz and can also be used to measure liquids.

In addition, the following references (1) to (4) propose methods for measuring and calculating the relative dielectric constant of water in the temperature and pressure regions above the critical point.

(1) M. Yao, K. Okada and Y. Imashuku, Rev. High Pressure Sci. Technol., 7, 1118 (1998)
(2) D. P. Fernandez, A. R. H. Goodwin, E. W. Lemmon, J. M. H. Levelt Sengers and R. C. Williams, J. Phys. Chem. Ref. Data., Vol. 26, No. 4 (1997)
(3) Yasuhiro SHIBUE, Hyogo University of Teacher Education Research Bulletin, Vol. 47 (2015)

Plastic to Be Cleaned

In the present invention, the plastic (used plastic molded product) to be cleaned may be any plastic as long as it is not decomposed by cleaning using water heated as described above, and referable examples of the plastic include olefin resins, such as low density polyethylene, linear low density polyethylene, medium or high density polyethylene, polypropylene, poly 1-butene, and poly 4-methyl-1-pentene. It is obvious that random or block copolymers of $\alpha$-olefins such as ethylene, propylene, 1-butene, 4-methyl-1-pentene, and the like may also be used, and cyclic olefin copolymers disclosed in JP 2007-284066A, and the like may also be suitably used. This is because such olefin resin is chemically extremely stable, and there is little risk of hydrolysis or other problems occurring when cleaning is performed using high-temperature water with a lowered dielectric constant.

Cleaning

Cleaning of the plastic as described above is performed by immersing the plastic to be cleaned in high temperature water with a lowered dielectric constant such as subcritical water and supercritical water, or more specifically by putting the plastic to be cleaned in a container storing the water as the cleaning medium and stirring it, for example. In addition, when the cleaning is performed, high temperature steam with a lowered dielectric constant is sprayed to the plastic to be cleaned, or the plastic is put into a container storing superheated steam being a cleaning medium and brought into contact with the steam.

In the present invention, it is preferable to perform cleaning using low-dielectric constant water as the cleaning medium, but to the extent that the advantages of the present invention are not impaired, acid, alkali, or a hydrophilic organic solvent such as ethanol may be added to the above-described low-dielectric constant water.

In addition, the cleaning may be performed in multiple steps by performing preliminary cleaning through a publicly known method before performing the cleaning with the above-mentioned low-dielectric constant water.

In principle, in the method of the present invention, a used plastic molded product is cleaned in its molded form, and the cleaned molded product is reused as a recycled product, but it is usually preferred to be crushed into a small form of granular material for easy cleaning. This is because the used plastic molded product in its large form is difficult to clean and also difficult to reuse as molded products because of the variations in form due to heat. In addition, the crushing has the advantage that the water as the cleaning medium can permeate into the plastic, and adsorbed impurities can be more effectively removed.

The plastic from which impurities (organic impurities represented by grease and other oil contaminations) are removed through the above-described cleaning can be pelletized by melt extrusion using an extruder or after being melt-kneaded with virgin plastic, and re-molded as recycled plastic for reuse as packaging containers and the like, for example. It is obvious that the cleaned plastic can be reused as it is as recycled products.

The method of the present invention uses water as the cleaning medium, and thus it does not cause an environmental pollution problem and reduces the burden of exhaust and waste liquid treatment. In addition, oil stains of plastic can be effectively removed to the same degree as when organic solvents are used as a cleaning medium, and also the problem of solvent residue in the plastic can be avoided.

EXAMPLES

The present invention will be further described with the following examples and comparative examples, but the present invention is not limited to the examples.

In the following examples and comparative examples, the cleaning treatment is performed by using samples of five types as the plastic to be cleaned, and the measurements and evaluations thereof are as follows.

Measurement of Impurities

The impurity components contained in the cleaned plastic were pretreated by solid-phase microextraction, and measured by gas chromatography-mass spectrometry, as described below.

GC/MS (GC-7890A, MSD-5975C) made by Agilent Technology was used as the gas chromatography-mass spectrometry apparatus.

In addition, SPME fiber (85 μm CAR/PDMS made by Supelco) was used as the adsorbent.

The pretreatment by the solid-phase microextraction was performed by putting 2 g of a sample in a headspace vial, adding SPME fiber as an adsorbent, and storing the vial at 40° C. for 15 minutes to adsorb impurity components onto the SPME fiber.

The above-described SPME fiber was attached to the gas chromatography-mass spectrometry apparatus to desorb the impurity components adsorbed to the SPME fiber, and the separated components were detected and mass analyzed for qualitative and quantitative determination of the impurity components.

The conditions of the above-described measurement are as follows.

Column:
    Agilent Technology J&W DB-WAX
    (60 m×0.25 mm, film thickness 5μ)
    Carrier Gas: Helium
    Detector: MSD
    Ionization Method: EI
    Oven Temperature: The temperature was increased from 45° C. to 220° C. at a rate of 7° C./min and held for 15 minutes. The inlet temperature was 250° C., the injection mode was splitless, and the mass spectral range was 27 to 600.

From the chart obtained by the measurement, the sum of area values of the various components, excluding hydrocarbons, was taken as the amount of the impurity components, and by comparison with the samples before and after the cleaning treatment, the removal efficiency (%) of the amount of the impurity components by the treatment was calculated using the following formula.

$$\text{Removal efficiency (\%)} = (1 - X/Y) \times 100$$

$X$ is the area value of the sample after the cleaning treatment.

$Y$ is the area value of the untreated sample not subjected to the cleaning treatment.

Evaluation of Yellowing of Sample Due to Cleaning Treatment

The yellowing of the sample due to the cleaning treatment was evaluated by the $b^*$ value of CIE1976 ($L^*$, $a^*$, $b^*$) color space.

That is, the yellowing of the sample due to the cleaning treatment was evaluated by using the color difference meter made by SUGA TEST INSTRUMENT Co, Ltd., and used as a reference for suppressing resin degradation. The smaller the variation of the $b^*$ value before and after the cleaning treatment, the smaller the resin degradation, and the greater the variation of the $b^*$ value, the greater the resin degradation due to the cleaning treatment.

Relative Dielectric Constant of Water

The relative dielectric constant of the water used for cleaning was calculated based on references (2) and (3).

Plastic Used for Cleaning

Sample A:
Flakes of crushed used bottles obtained by draining edible oil from high-density polyethylene bottles held at 25° C. for 3 months after filling with edible oil.
The area value derived from impurities: 1.1×E+08
$b^*$ value: −3.57
Sample B:
Flakes of crushed used bottles obtained by draining edible oil from high-density polyethylene bottles held at 25° C. for 3 months after filling with edible oil, and then rinsing and removing the edible oil from the surface as much as possible.
The area value derived from impurities: 2.9×E+07
$b^*$ value: −1.93
Sample C:
Flakes of crushed used bottles obtained by draining mayonnaise from low-density polyethylene bottles held at 25° C. for 3 months after filling with mayonnaise.
The area value derived from impurities: 4.0×E+07
$b^*$ value: −0.34
Sample D:
Virgin pellets of high-density polyethylene
The area value derived from impurities: 6.1×E+06
$b^*$ value: −4.14
Sample E:
Crushed flakes of high-density polyethylene bottles that have not been filled with edible oil.
The area value derived from impurities: 1.1×E+07
$b^*$ value: −3.31

Example 1

A sample A was used as the plastic to be cleaned.

The sample A was placed in a test treatment apparatus filled with superheated steam of 240° C., treated for 5 minutes, and after the treatment, the test treatment apparatus was opened, and the sample A was removed at the treatment temperature. The treatment conditions are as follows.

The treatment temperature: 240° C.
    The treatment time: 5 minutes
    The relative dielectric constant of the water used for the cleaning treatment: 28

The test treatment apparatus filled with the superheated steam is not a completely closed system, and the superheated steam is constantly supplied at a constant flow rate and sequentially discharged. The inner dimensions of the test treatment apparatus were 200 mm square, and the flow rate of superheated steam was 20 kg/h. A stainless-steel mesh basket with a base area of 50 mm×50 mm was used for static placement in the test treatment apparatus. 10 g of the sample were prepared in the mesh basket and. then the treatment was performed.

The obtained samples after the cleaning treatment were pretreated by solid-phase microextraction and gas chromatography-mass spectrometry to measure the impurity components, and b* values were measured by a colorimeter. Table 1 shows the results of various evaluations.

Example 2

The sample A was cleaned and measured in the same manner as in Example 1, except that the treatment time was set to 10 minutes. Table 1 shows the results of various evaluations.

Example 3

The sample A was cleaned and measured in the same manner as in Example 1, except that the treatment time was set to 30 minutes. Table 1 shows the results of various evaluations.

Comparative Example 1

The cleaning treatment and measurement were performed in the same manner as in Example 1, except that the sample A was cleaned using normal temperature water (25° C.) instead of the cleaning treatment using superheated steam.

Note that the cleaning treatment using the normal temperature water was performed in the following manner.

10 g of the prepared sample A was stirred with 500 mL of the normal temperature water in a beaker for 10 minutes. Thereafter, the normal temperature water was replaced, and the same operation was repeated three times, and then the cleaning treatment was performed for a total of 40 minutes. The relative dielectric constant of the water used for the cleaning treatment was 78.

Table 1 shows the results of various evaluations.

Example 4

The same test and measurement as in Example 1 were performed, except that a sample B was used as the plastic to be cleaned, and the cleaning treatment was performed with water with a relative dielectric constant of 35 at a treatment temperature of 200° C. Table 1 shows the results of various evaluations.

Example 5

The sample B was cleaned and then tested and measured in the same manner as in Example 4, except that the treatment time was set to 10 minutes. Table 1 shows the results of various evaluations.

Example 6

The sample B was cleaned and then tested and measured in the same manner as in Example 4, except that treatment time was set to 30 minutes. Table 1 shows the results of various evaluations.

Example 7

The sample B was cleaned and then tested and measured in the same manner as in Example 4, except that the cleaning treatment was performed using water with a relative dielectric constant of 28 at a treatment temperature of 240° C. Table 1 shows the results of various evaluations.

Example 8

The sample B was cleaned and measured in the same manner as in Example 7, except that the treatment time was set to 10 minutes. Table 1 shows the results of various evaluations.

Example 9

The sample B was cleaned and then tested and measured in the same manner as in Example 7, except that the treatment time was set to 30 minutes. Table 1 shows the results of various evaluations.

Example 10

The sample B was cleaned and then tested and measured in the same manner as in Example 7, except that the flow rate of the superheated steam was set to 10 kg/h. Table 1 shows the results of various evaluations.

Example 11

The sample B was cleaned and then tested and measured in the same manner as in Example 7, except that the flow rate of the superheated steam was set to 5 kg/h. Table 1 shows the results of various evaluations.

Example 12

The sample B was cleaned and then tested and measured in the same manner as in Example 7, except that the temperature was lowered to 150° C. in a superheated steam atmosphere before opening and taking out the test treatment apparatus instead of opening the test treatment apparatus at the treatment temperature after the treatment. Table 1 shows the results of various evaluations.

Comparative Example 2

The sample B was cleaned and then tested and measured in the same manner as in Example 4, except that the treatment was performed using a heating oven instead of using the superheated steam.

In the treatment using the heating oven, the prepared flakes were placed in the oven heated at 200° C. and treated for 5 minutes, and then the oven was open to take out the flakes after the treatment. Table 1 shows the results of various evaluations.

Comparative Example 3

The sample B was cleaned and then tested and measured in the same manner as in Comparative Example 2, except that the treatment temperature was set to 240° C. Table 1 shows the results of various evaluations.

Example 13

The same test and measurement as in Example 1 were performed, except that a sample C was used as the plastic to be cleaned. Table 1 shows the results of various evaluations.

Example 14

The same test and measurement as in Example 12 were performed, except that a sample D was used as the plastic to be cleaned. Table 1 shows the results of various evaluations.

Example 15

A sample A was used as the plastic to be cleaned. The flakes of the prepared sample A and pure water were filled in a reaction jig, and placed and treated in a salt bath at 200° C. for 10 minutes. After the treatment, the sample A was left to reach room temperature and then removed.

In this case, the treatment temperature was 200° C., the treatment time was 10 minutes, and the cleaning treatment was performed using water with a relative dielectric constant of 35. The amount of pure water used was 3.805 g with respect to 1 g of flakes, and the reaction pressure was 1.55 MPa, which is the saturated steam pressure.

The obtained samples after the cleaning treatment were pretreated by solid-phase microextraction and gas chromatography-mass spectrometry to measure the impurity components, and b* values were measured by a colorimeter. Table 1 shows the results of various evaluations.

Example 16

The sample A was cleaned and then tested and measured in the same manner as in Example 15, except that the cleaning treatment was performed using water with a relative dielectric constant of 28 at a treatment temperature of 240° C., the amount of the pure water used was set to 3.579 g with respect to flakes 1 g, and the reaction pressure saturation was set to 3.35 MPa, which is the steam pressure. Table 1 shows the results of various evaluations.

Example 17

The same test and measurement as in Example 15 were performed, except that the sample B was used as the plastic to be cleaned. Table 1 shows the results of various evaluations.

TABLE 1

| | | Removal of Impurities | | Inhibition of Resin Yellowing | |
| --- | --- | --- | --- | --- | --- |
| | | Total Area Value | Removal Efficiency | b*value | b*value difference |
| Example | 1(A) | 3.9.E+07 | 65% | −1.92 | 1.66 |
| | 2(A) | 3.7.E+07 | 66% | 0.50 | 4.08 |
| | 3(A) | 3.3.E+07 | 70% | 5.58 | 9.16 |
| Comparative Example | 1(A) | 7.3.E+07 | 34% | −2.35 | 1.22 |
| Example | 4(B) | 1.4.E+07 | 51% | −0.24 | 1.69 |
| | 5(B) | 1.1.E+07 | 61% | −1.02 | 0.90 |
| | 6(B) | 1.4.E+07 | 51% | 1.89 | 3.82 |
| | 7(B) | 9.7.E+06 | 66% | −0.36 | 1.56 |
| | 8(B) | 1.2.E+07 | 59% | 3.71 | 5.64 |
| | 9(B) | 1.1.E+07 | 60% | 2.55 | 4.48 |
| | 10(B) | 1.2.E+07 | 59% | −0.85 | 1.08 |
| | 11(B) | 1.2.E+07 | 58% | 1.96 | 3.88 |
| | 12(B) | 8.3.E+06 | 71% | −2.58 | 0.66 |
| Comparative Example | 2(B) | 2.7.E+07 | 8% | −2.64 | 0.72 |
| | 3(B) | 2.4.E+07 | 18% | −2.22 | 0.30 |
| Example | 13(C) | 2.O.E+07 | 50% | 1.95 | 2.30 |
| | 14(D) | 3.0.E+06 | 50% | −5.14 | 1.01 |
| Example | 15(A) | 5.6.E+07 | 50% | 6.76 | 10.34 |
| | 16(A) | 4.4.E+07 | 61% | 11.11 | 14.68 |
| | 17(B) | 1.2.E+07 | 59% | 3.79 | 5.72 |

The invention claimed is:

1. A method of removing impurities from plastic, the method comprising:

cleaning the plastic by spraying the plastic to remove impurities with superheated steam having a temperature of 180° C. to 300° C. and a relative dielectric constant of 40 or less followed by lowering the temperature of the superheated steam to 150° C. in a superheated steam atmosphere to obtain a cleaned plastic, wherein the plastic is polyolefin, the plastic is a used plastic molded product, the plastic is not decomposed by the superheated steam, the impurities are dissolved in the plastic, the superheated steam is sprayed to the plastic under a condition of a non-closed system where the superheated steam is supplied and sequentially discharged.

2. The method according to claim 1, wherein the polyolefin is polyethylene or polypropylene.

3. The method according to claim 2, wherein the used plastic molded product is a bottle.

\* \* \* \* \*